US011982118B2

(12) United States Patent
Erickson et al.

(10) Patent No.: US 11,982,118 B2
(45) **Date of Patent: *May 14, 2024**

(54) CASEMENT SLIDING OPERATOR

(71) Applicant: Pella Corporation, Pella, IA (US)

(72) Inventors: Nathan R. Erickson, Altoona, IA (US); Jason L. Jungling, Altoona, IA (US)

(73) Assignee: Pella Corporation, Pella, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,420

(22) Filed: Sep. 21, 2022

(65) Prior Publication Data

US 2023/0018562 A1 Jan. 19, 2023

Related U.S. Application Data

(60) Continuation of application No. 17/105,064, filed on Nov. 25, 2020, now Pat. No. 11,480,001, which is a division of application No. 15/836,143, filed on Dec. 8, 2017, now Pat. No. 10,876,343.

(Continued)

(51) Int. Cl.

| | |
|---|---|
| ***E05F 11/24*** | (2006.01) |
| ***E05F 11/10*** | (2006.01) |
| ***E05F 11/16*** | (2006.01) |
| ***E06B 3/32*** | (2006.01) |

(52) U.S. Cl.

CPC .............. *E05F 11/10* (2013.01); *E05F 11/16* (2013.01); *E06B 3/325* (2013.01); *E05Y 2201/21* (2013.01); *E05Y 2201/244* (2013.01); *E05Y 2201/26* (2013.01); *E05Y 2201/652* (2013.01); *E05Y 2201/654* (2013.01); *E05Y 2201/656* (2013.01); *E05Y 2201/676* (2013.01); *E05Y 2201/68* (2013.01); *E05Y 2201/71* (2013.01);

(Continued)

(58) Field of Classification Search

CPC ...... E05F 11/10; E06B 3/325; E05Y 2201/21; E05Y 2201/244; E05Y 2201/26; E05Y 2201/676; E05Y 2201/68; E05Y 2201/71; E05Y 2201/722; E05Y 2900/148

USPC .................. 49/246, 248, 249, 250, 251, 252

See application file for complete search history.

(56) References Cited

U.S. PATENT DOCUMENTS 1,748,662 A * 2/1930 Stewart ................... E05F 11/12 160/95
4,266,371 A 5/1981 Erdman et al.

(Continued)

FOREIGN PATENT DOCUMENTS

CA 2988151 A1 * 6/2018 .............. E05F 11/10
CA 3081316 A1 * 11/2020 .............. E05F 11/06

(Continued)

*Primary Examiner* — Jerry E Redman

(74) *Attorney, Agent, or Firm* — FAEGRE DRINKER BIDDLE & REATH LLP

(57) ABSTRACT

A casement window operator includes a linear input mechanism configured to be mounted to a stationary frame of a casement window, a linear to rotary motion converter operably coupled to an output of the linear input mechanism, a gear reducer operably coupled to an output of the rotary motion converter, and a sash arm operably coupled to an output of the gear reducer to rotate in conjunction with the output of the gear reducer. The sash arm is configured to extend from the stationary frame of the casement window to a rotatable window sash of the casement window.

18 Claims, 12 Drawing Sheets

Related U.S. Application Data

(60) Provisional application No. 62/431,870, filed on Dec. 9, 2016, provisional application No. 62/431,716, filed on Dec. 8, 2016.

(52) U.S. Cl.
CPC ... *E05Y 2201/722* (2013.01); *E05Y 2900/148* (2013.01)

(56) References Cited

U.S. PATENT DOCUMENTS

| | | | | | |
|---|---|---|---|---|---|
| 4,937,976 | A * | 7/1990 | Tucker | E05F 11/06 49/260 |
| 5,560,148 | A * | 10/1996 | Chang | E05D 15/502 49/382 |
| 5,581,941 | A * | 12/1996 | Sill | E05D 15/48 49/246 |
| 10,119,318 | B1 | 11/2018 | Wolf et al. | |
| 10,676,977 | B2 * | 6/2020 | Erickson | E05F 11/10 |
| 10,876,343 | B2 * | 12/2020 | Erickson | E05F 11/10 |
| 11,480,001 | B2 * | 10/2022 | Erickson | E05F 11/16 |
| 2002/0124468 | A1 | 9/2002 | Manzella | |

FOREIGN PATENT DOCUMENTS

| | | | | |
|---|---|---|---|---|
| CN | 104712229 | A * | 6/2015 | |
| EP | 1688571 | B1 * | 12/2008 | E05D 7/085 |
| JP | 2003041834 | A * | 2/2003 | |
| JP | 2006063557 | A * | 3/2006 | |

* cited by examiner

CASEMENT SLIDING OPERATOR

CROSS-REFERENCE TO RELATED APPLICATION

This application is a continuation application that claims priority to U.S. application Ser. No. 17/105,064, filed Nov. 25, 2020, which is a Divisional of U.S. application Ser. No. 15/836,143, filed Dec. 8, 2017, which claims the benefit of Provisional Application No. 62/431,716, filed Dec. 8, 2016 and Provisional Application No. 62/431,870, filed Dec. 9, 2016, which are herein incorporated by reference in their entireties.

BACKGROUND

There is a desire for ongoing improvements in fenestration hardware, such as hardware for casement windows.

SUMMARY

The disclosure pertains to a casement window including a casement window operator with a linear input mechanism, such as a slideable handle, that drives a rotatable sash arm to open and close the window. Such linear input mechanisms provide an alternative to casement window operators with rotary input mechanisms, such as rotatable crank mechanisms. Also disclosed is sliding operator handle brake, which may secure the linear input mechanism when it is not being operated.

In one example, this disclosure is directed to a casement window operator comprising a linear input mechanism configured to be mounted to a stationary frame of a casement window, a linear to rotary motion converter operably coupled to an output of the linear input mechanism, a gear reducer operably coupled to an output of the rotary motion converter, and a sash arm operably coupled to an output of the gear reducer to rotate in conjunction with the output of the gear reducer. The sash arm is configured to extend from the stationary frame of the casement window to a rotatable window sash of the casement window.

In another example, this disclosure is directed to a casement window comprising a stationary frame, a rotatable window sash pivotably connected to the stationary frame, and a casement window operator. The casement window operator includes a linear input mechanism mounted to the stationary frame, a linear to rotary motion converter operably coupled to an output of the linear input mechanism, a gear reducer operably coupled to an output of the rotary motion converter, and a sash arm operably coupled to an output of the gear reducer to rotate in conjunction with the output of the gear reducer. A distal end of the sash arm is connected to the rotatable window sash such that rotation of the sash arm drives pivoting of the rotatable window sash relative to the stationary frame.

In a different example, this disclosure is directed to a method of operating a casement window, the method comprising sliding a linear input mechanism mounted to a stationary frame of the casement window. The casement window includes the stationary frame, a rotatable window sash pivotably connected to the stationary frame, and a casement window operator. The casement window operator includes the linear input mechanism mounted to the stationary frame, a linear to rotary motion converter operably coupled to an output of the linear input mechanism, and a gear reducer operably coupled to an output of the rotary motion converter. The casement window operator further includes a sash arm operably coupled to an output of the gear reducer to rotate in conjunction with the output of the gear reducer. A distal end of the sash arm is connected to the rotatable window sash such that rotation of the sash arm drives pivoting of the rotatable window sash relative to the stationary frame in response to the sliding of the linear input mechanism.

In a further example, this disclosure is directed to a sliding operator handle comprising a track mount configured to slidably mate with a track, an actuatable brake providing at least one braking position in which the actuatable brake is configured to contact the track and restrict sliding motion of the track mount along the track and at least one sliding position in which the actuatable brake is configured to reduce contact with the track and allow sliding motion of the track mount along the track, and a handle pivotably coupled to the track mount. The handle is configured to receive a manual input force to slide the track mount in either direction along the track, and being further configured to actuate the actuatable brake in response to the manual input force. The handle includes a neutral position corresponding to the at least one braking position of the actuatable brake. The handle includes a first actuation position corresponding to the manual input force in a first direction along the track, the first actuation position corresponding to the at least one sliding position of the actuatable brake to allow sliding motion of the track mount along the track in the first direction. The handle includes a second actuation position corresponding to the manual input force in a second direction along the track, the second actuation position also corresponding to the at least one sliding position of the actuatable brake to allow sliding motion of the track mount along the track in the second direction.

In another example, this disclosure is directed to a casement window comprising a stationary frame, a rotatable window sash pivotably connected to the stationary frame, and a casement window operator. The casement window operator includes a linear input mechanism mounted to the stationary frame, a linear to rotary motion converter operably coupled to an output of the linear input mechanism, and a sash arm operably coupled to an output of the linear to rotary motion converter. A distal end of the sash arm is connected to the rotatable window sash such that rotation of the sash arm drives pivoting of the rotatable window sash relative to the stationary frame. The linear input mechanism includes a track and a sliding operator handle. The sliding operator handle comprises a track mount slidably mated with the track, an actuatable brake providing at least one braking position in which the actuatable brake contacts the track and restrict sliding motion of the track mount along the track and at least one sliding position in which the actuatable brake reduces contact with the track and allow sliding motion of the track mount along the track, and a handle pivotably coupled to the track mount, the handle being configured to receive a manual input force to slide the track mount in either direction along the track, and being further configured to actuate the actuatable brake in response to the manual input force. The handle includes a neutral position corresponding to the at least one braking position of the actuatable brake. The handle includes a first actuation position corresponding to the manual input force in a first direction along the track, the first actuation position corresponding to the at least one sliding position of the actuatable brake to allow sliding motion of the track mount along the track in the first direction to open the rotatable window sash. The handle includes a second actuation position corresponding to the manual input force in a second direction along the track, the second actuation position also corresponding to the at least one sliding position of the actuatable brake to allow sliding motion of the track mount along the track in the second direction to close the rotatable window sash.

In a different example, this disclosure is directed to a method of operating a casement window, the method comprising sliding a linear input mechanism mounted to a stationary frame of the casement window. The casement window includes a stationary frame, a rotatable window sash pivotably connected to the stationary frame, and a casement window operator. The casement window operator includes a linear input mechanism mounted to the stationary frame, a linear to rotary motion converter operably coupled to an output of the linear input mechanism, a sash arm operably coupled to an output of the linear to rotary motion converter. A distal end of the sash arm is connected to the rotatable window sash such that rotation of the sash arm drives pivoting of the rotatable window sash relative to the stationary frame. The linear input mechanism includes a track and a sliding operator handle. The sliding operator handle comprises a track mount slidably mated with the track, an actuatable brake providing at least one braking position in which the actuatable brake contacts the track and restrict sliding motion of the track mount along the track and at least one sliding position in which the actuatable brake reduces contact with the track and allow sliding motion of the track mount along the track, and a handle pivotably coupled to the track mount, the handle being configured to receive a manual input force to slide the track mount in either direction along the track, and being further configured to actuate the actuatable brake in response to the manual input force. The handle includes a neutral position corresponding to the at least one braking position of the actuatable brake. The handle includes a first actuation position corresponding to the manual input force in a first direction along the track, the first actuation position corresponding to the at least one sliding position of the actuatable brake to allow sliding motion of the track mount along the track in the first direction to open the rotatable window sash. The handle includes a second actuation position corresponding to the manual input force in a second direction along the track, the second actuation position also corresponding to the at least one sliding position of the actuatable brake to allow sliding motion of the track mount along the track in the second direction to close the rotatable window sash.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

DETAILED DESCRIPTION

The disclosure pertains to fenestration units, particularly to fenestration units that pivot. This generally includes fenestration units that pivot about a stationary or moving vertical axis, such as a casement window, although applications in fenestration units that pivot about a horizontal axis are also contemplated. In some examples, as illustrated in FIG. 1, a fenestration unit can be a casement window.

Figure 1A:
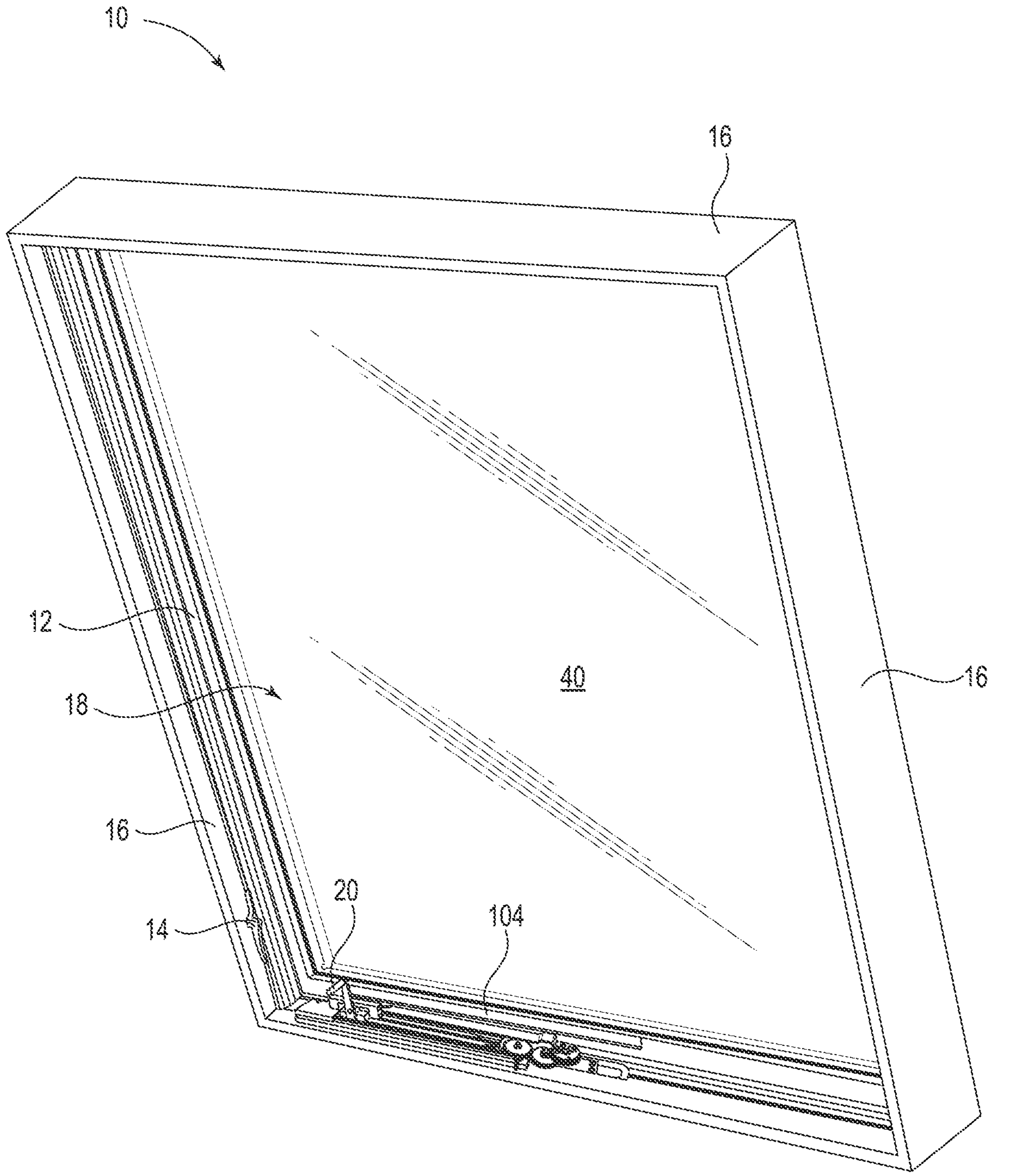
FIGS. 1A and 1B illustrate a closed casement window including a casement window operator with a linear input mechanism.
Figure 1B:
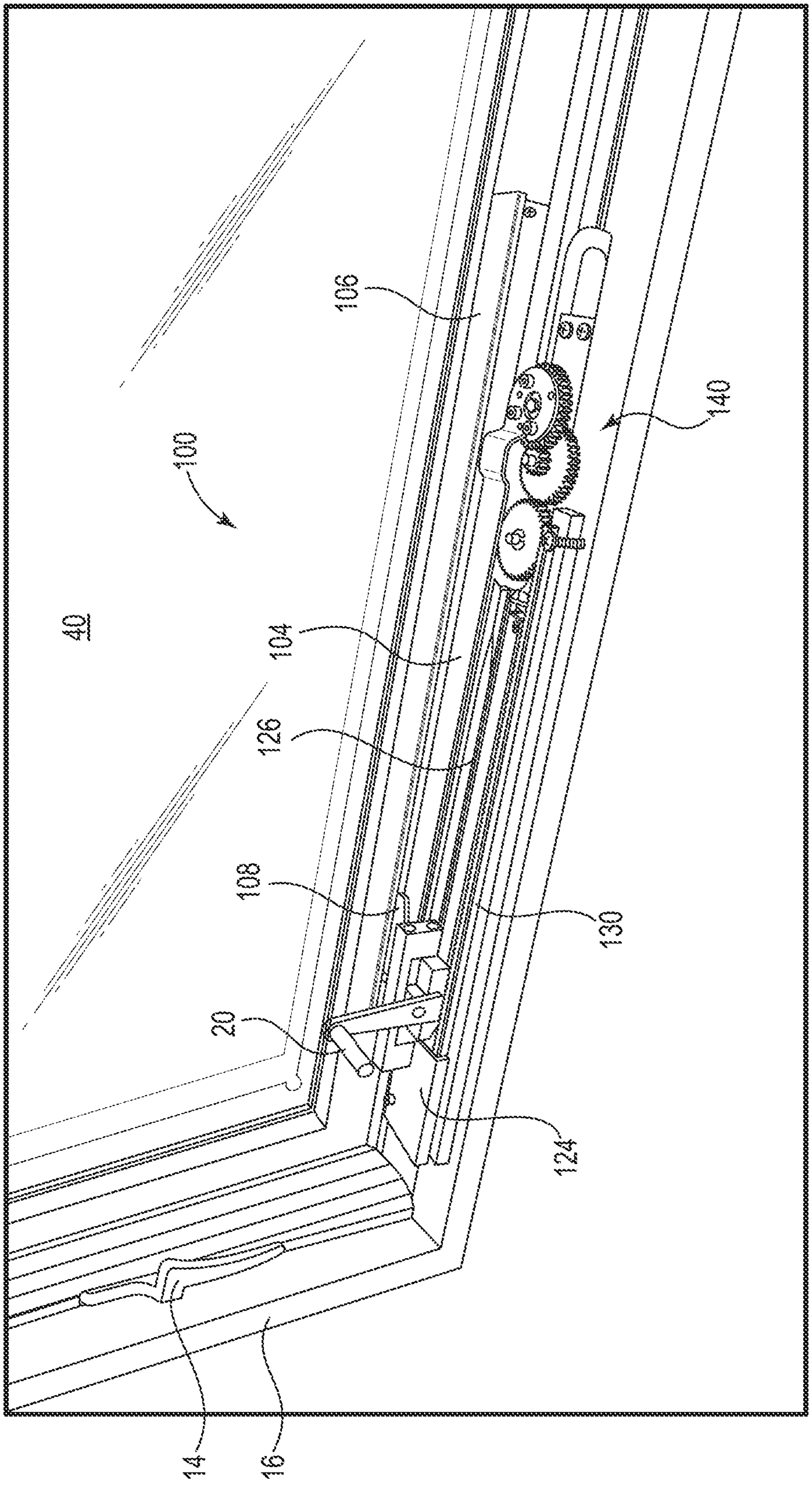
Figure 2A:
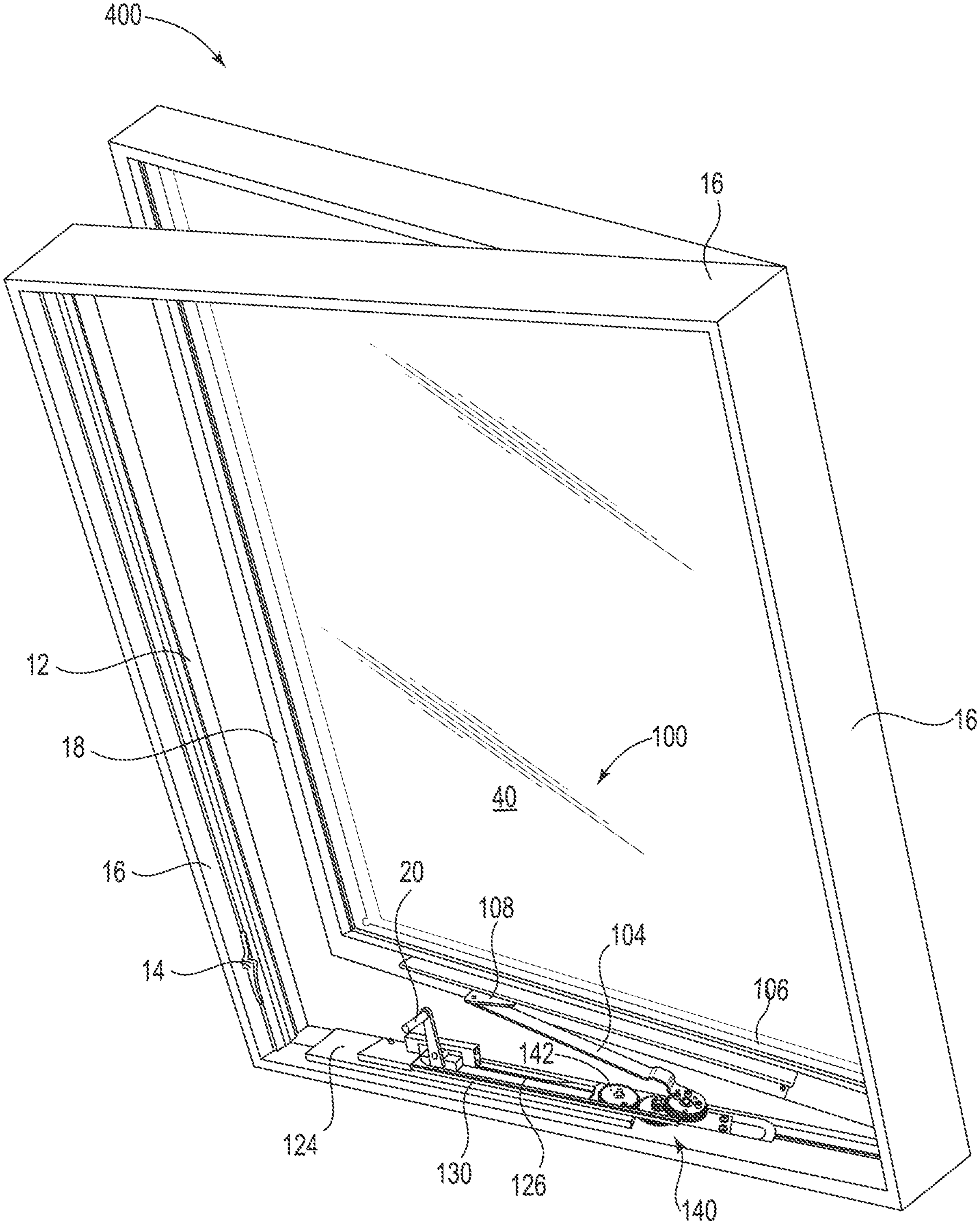
FIGS. 2A and 2B illustrate an open casement window including a casement window operator with a linear input mechanism.
Figure 2B:
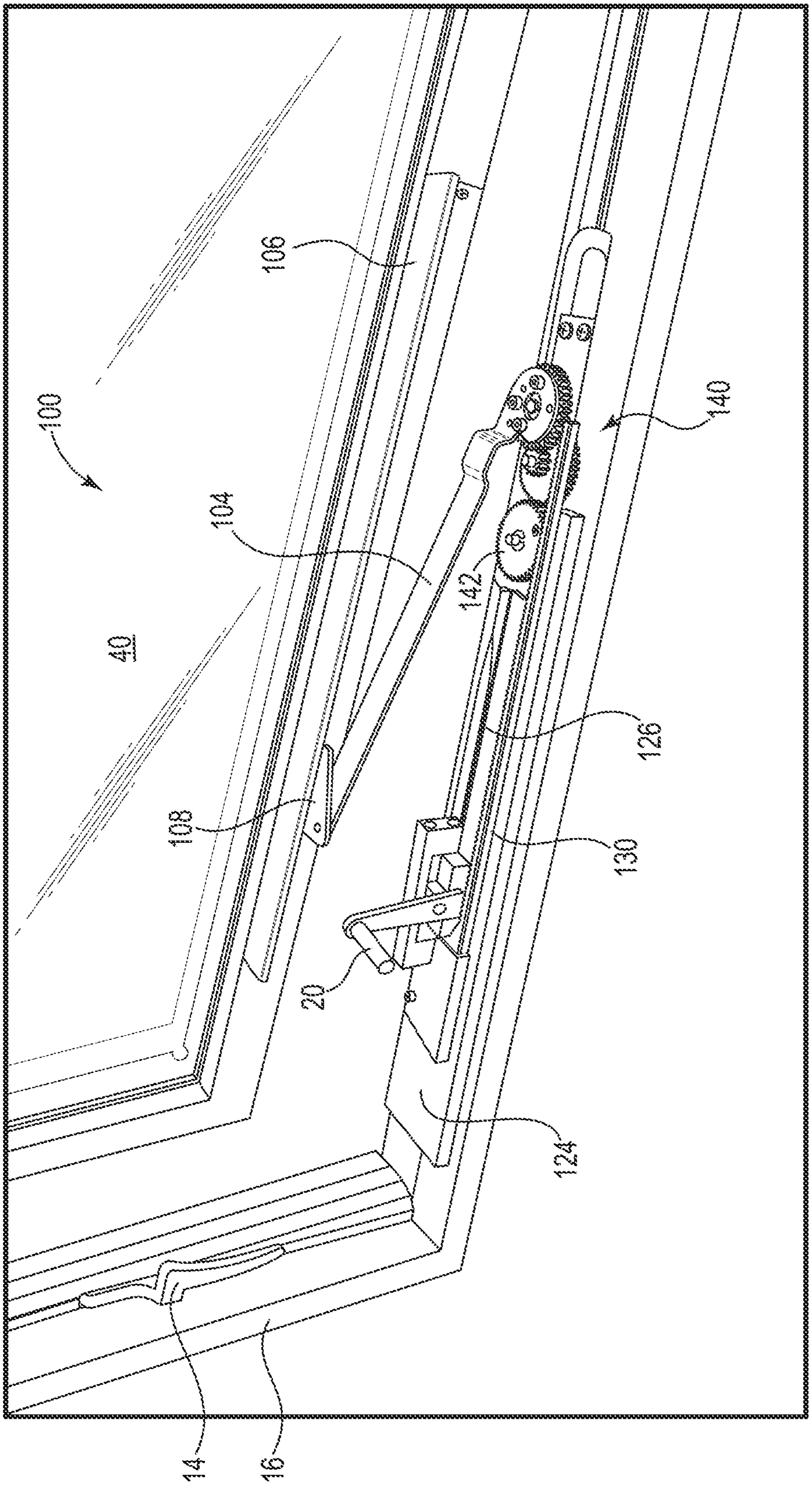

FIGS. 1A and 1B illustrate a casement window 10 when closed as viewed from inside a structure in which it is installed. FIGS. 2A and 2B illustrate casement window 10 when open as viewed from inside the structure in which it is installed. More particularly, FIGS. 1A and 2A illustrate full views of casement window 10, whereas FIGS. 1B and 2B illustrate close-up views of a casement window operator 102, which includes a linear input mechanism 124 with a handle 20.

Casement window 10 includes a window frame 16 adapted to be received in a rough opening created in a building structure (not shown). As used herein the phrase "window frame" refers to a framework mounted in a rough opening of a building structure for receiving and supporting one or more sashes of a window assembly. As used herein, the term "sash" refers to a framework for receiving and supporting one or more glazing panes. In double hung, awning, and casement windows, the sashes can be moved relative to the window frame. In a fixed window, the sash does not typically move relative to the window frame, but can be removed for repair purposes. While the techniques of this disclosure are generally described with respect to casement windows, one type of closure assembly, similar closure assemblies may also be included in door assemblies. In a door, there can be a fixed or a moveable sash or multiple combinations of both. The moveable door sash can be moved laterally (sliding or rolling) or pivoting with side hinges.

Window frame 16 can be constructed of wood, vinyl, aluminum, or a variety of other materials. In the illustrated example, window frame 16 includes four peripheral frame members joined and secured together to form a rectangular shape corresponding to the shape of the rough opening. The inner perimeter of the rough opening is slightly larger than the perimeter of window frame 16 of casement window 10, so that casement window 10 can be received in the rough opening during installation. The methods of mounting window frame 16 to the rough opening are well known in the window industry.

Window frame 16 defines a window opening 18. In the illustrated example, window opening 18 has a rectangular shape. Although casement window 10 in the illustrated example is rectangular, it is understood that the present disclosure is not limited by the shape of casement window 10 as illustrated.

Casement window 10 also includes a rotatable sash 12 attached to window frame 16 and received in window opening 18 defined by window frame 16. In various examples, during opening and closing, sash 12 may pivot about a hinged connection with window frame 16 or may rotate as part of a linkage. Latch 14 functions to lock or release sash 12 from window frame 16 while sash 12 is in the closed position. In some examples, casement window 10 further includes an openable secondary sash (not shown) that is pivotally attached to sash 12. In the illustrated example, sash 12 is operated via handle 20 of linear input mechanism 124 for opening and closing sash 12 by actuation of sash arm 104. Sash 12 is mounted to sash arm 104, which engages sash 12 via slider 108 and sash track 106 to drive opening and closing of sash 12. During the opening and closing of sash 12, slider 108 moves within sash track 106 of sash 12 to allow sash 12 to swing outwardly from window frame 16 while window frame 16 remains stationary. While sash arm 104 is shown as a single bar with slider 108 in sash track 106, in other examples, sash arm 104 may instead include two bars with a hinge, or otherwise form part of a four-bar linkage without sash track 106.

Sash 12 may be made of durable material, such as wood, vinyl, aluminum or variety of other materials. The methods of making window sashes are well known in the window manufacturing industry. Sash 12 includes a glazing unit 40 that is secured within sash 12. Glazing unit 40 can include a single glass layer, two glass layers, or more. In some examples, glazing unit 40 can include various coatings that impact visible and/or UV light transmission through glazing unit 40.

Sash arm 104 is actuated via casement window operator 102. Casement window operator 102 may be operated manually via handle 20 of linear input mechanism 124, which is mounted to frame 16. Handle 20 facilitates manual operation of casement window operator by a user via linear actuation of linear input mechanism 124. Linear input mechanism 124 is slideable along track 126. In some examples, track 126 may include stops, such as endcaps to limit the range of motion of linear input mechanism 124. In some examples, linear input mechanism 124 may include linear bearings to facilitate smooth rotation of sash 12 via handle 20.

In the same or different examples, handle 20 and linear input mechanism 124 may combine to provide a break mechanism to hold sash 12 at a fully open position or at intermediate positions between the fully open position and the fully closed position. Such a break mechanism may include a spring loaded brake that interferes with the sliding of linear input mechanism 124 along track 126. For example, a spring loaded brake mechanism could be inherently released when a manual actuation force is applied to handle 20. In one example, as described below with respect to sliding operator handle 200 of FIGS. 5A-5C, handle 20 may pivot in either direction relative to linear input mechanism 124 in order to release the spring-loaded brake when a manual actuation force is applied to handle 20. Of course, other breaking mechanisms may be substituted for a spring-loaded brake, or no brake may be used.

As shown, track 126 is mounted to the bottom of frame 16. In other examples, casement window operator 102 and track 126 may instead be mounted to the top of frame 16 or sides of frame 16. For example, mounting casement window operator 102 and track 126 to a side of frame 16 may be used with a bottom or top hinge pivot for sash 12 within frame 16.

A user may operate casement window 10 to open and close sash 12 via handle 20. Beginning with a closed sash 12, as shown in FIGS. 1A and 2A, a user may release latch 14. Then, the user may pull handle 20 in a direction towards the hinged side of sash 12 to slide linear input mechanism 124, which drives input pulley 142 of gear reducer 140 via rack 130. As sash arm 104 is operably coupled to output gear 105, such action causes the opening of sash 12. The user may close sash 12 by pulling handle in the opposite direction.

Figure 3A:
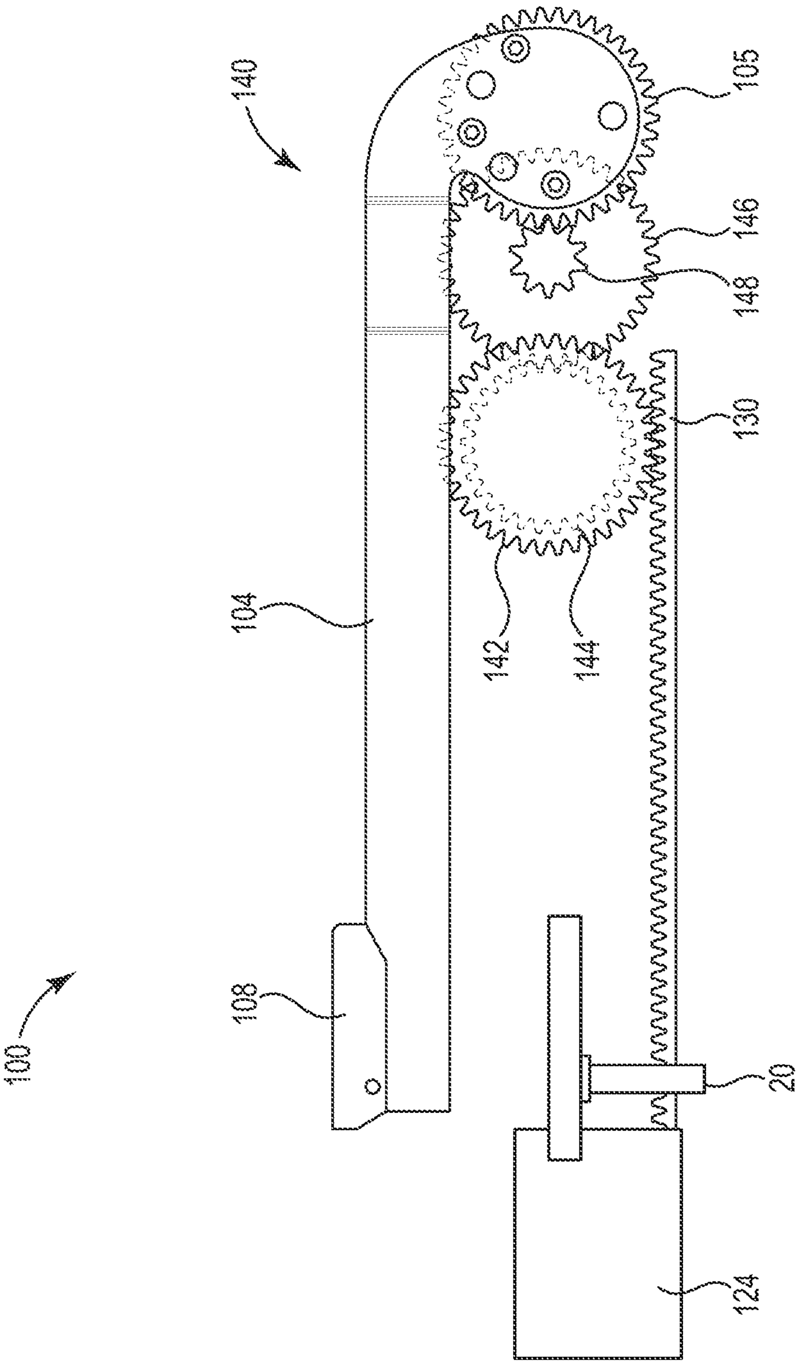
FIGS. 3A and 3B illustrate a top view of a casement window operator in closed and open configurations, respectively.
Figure 3B:
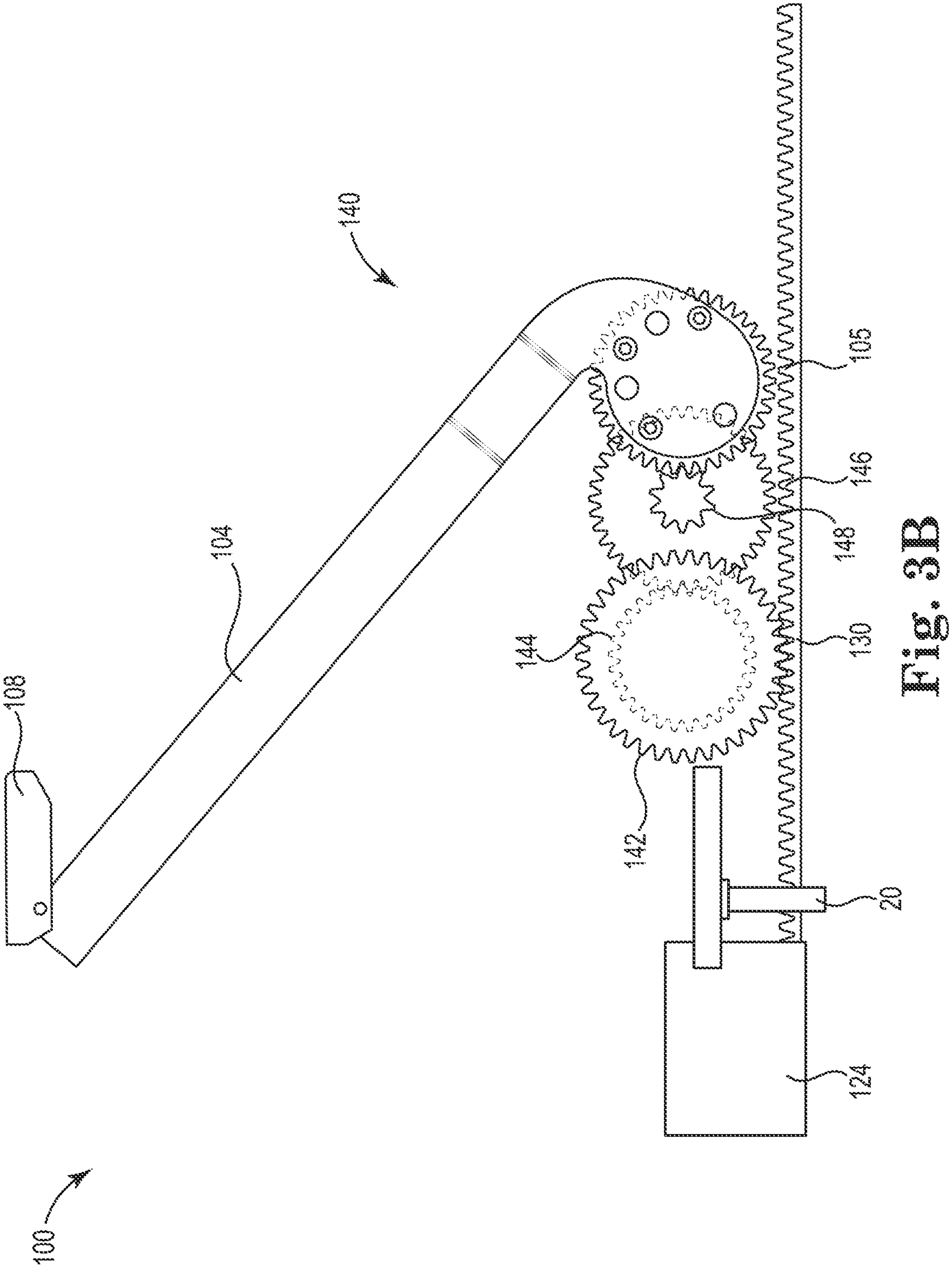

FIGS. 3A and 3B illustrate a top view of casement window operator 102 in closed and open configurations, respectively. Casement window operator 102 includes linear input mechanism 124 with handle 20 for opening and closing sash 12. Linear input mechanism 124 further includes a rack 130, which combines with input pulley 142 of gear reducer 140 to form a rack and pinion and functions to rotate input pulley 142. The rack and pinion represents one example of a linear to rotary motion converter operably coupled to an output of linear input mechanism 124. The output of the rack and pinion, input pulley 142, a gear in this example, is operably coupled to gear reducer 140, which includes intermediate gears 144, 146, 148 and output gear 105. Sash arm 104 is operably coupled to output gear 105 to rotate in conjunction with output gear 105. Gear reducer 140 operates to translate the linear movement of rack 130 into the rotation of sash arm 104. The combined gear reduction through gear reducer 140 is such that the full opening and closing of sash 12 occurs over the range of movement of rack 130.

Gear reducer 140 further serves to limit the force required to open and close sash 12 via handle 20. In one example, a force of about 4 pounds was required to overcome the sealing force of a gasket between frame 16 and sash 12 while initially opening sash 12, whereas a force of only about 2 pounds was required for moving sash 12. Generally, it may be preferable to limit the force required to open and close sash 12 via handle 20 to less than about 10 pounds or even to less than about 5 pounds. Of course, these forces are merely examples and the actual forces required will vary according to the size, weight, design and construction of casement window 10 and its components, including the range of motion for linear input mechanism 124 and the gear ratio of gear reducer 140.

In addition, the location of slider 108 in sash track 106 further changes the effective ratio of movement of handle 20 relative to the rotation of sash 12. During initial opening slider 108 at its furthest position from the hinge (not shown) of sash 12, which provides the greatest mechanical advantage. Such a configuration may be helpful to limit the force required to overcome a gasket sealing force between sash 12 and frame 16 during the initial opening of sash 12.

Figure 4:
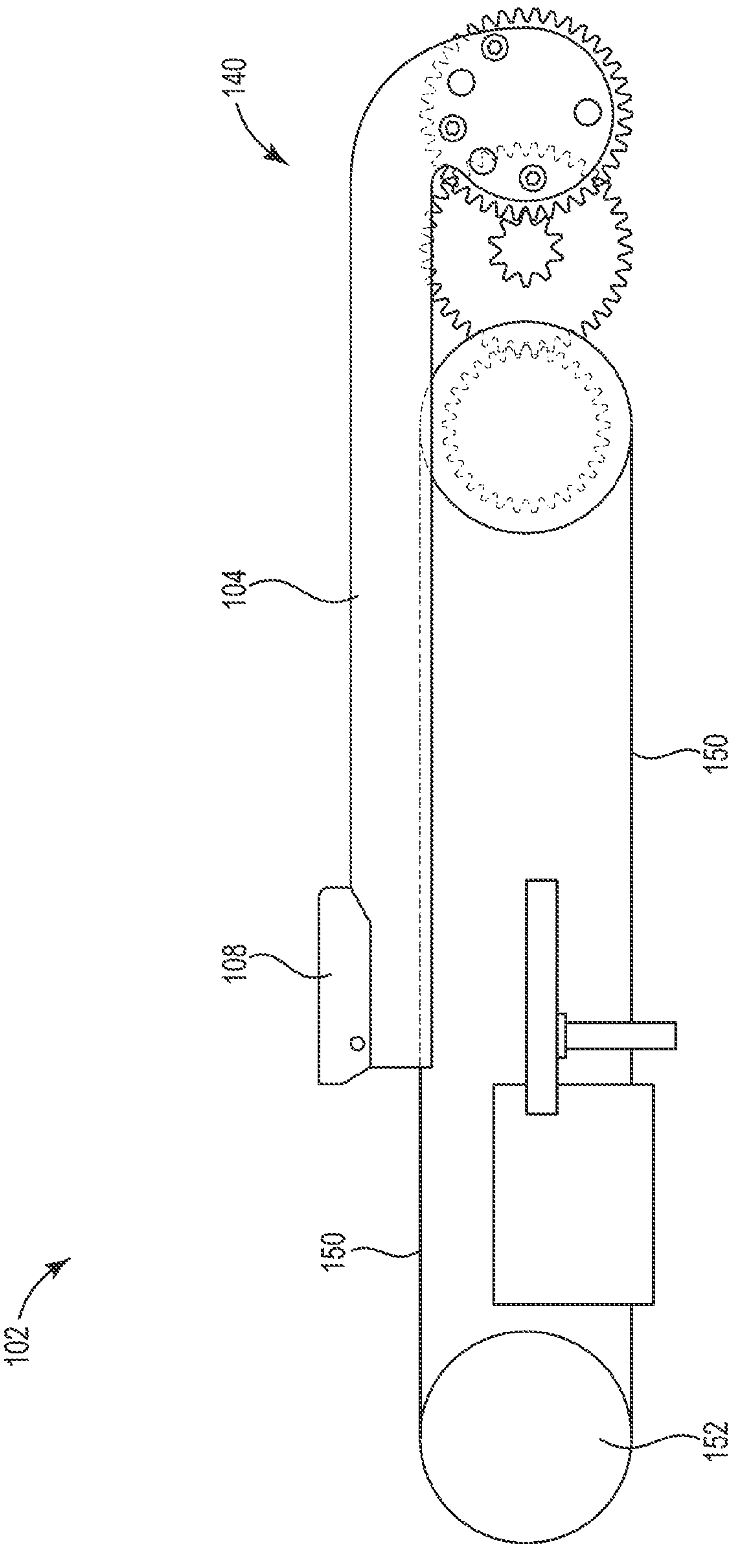
FIG. 4 illustrates a top view of a casement window operator in a closed configuration.

FIG. 4 illustrates casement window operator 102 in a closed configuration. In contrast to casement window operator 102, casement window operator 102 includes line 150 place of rack 130. For brevity, details of casement window operator 102 that are the same or similar to details of casement window operator 102 are described in limited or no detail.

Casement window operator 102 includes linear input mechanism 124 with handle 20 for opening and closing sash 12. Linear input mechanism 124 is connected to line 150 which extends around input pulley 142 to drive input pulley 142. In this manner, line 150 represents one example of a linear to rotary motion converter operably coupled to an output of linear input mechanism 124. In various examples, line 150 may include a chain, a belt and/or a cable. Line 150 operates to drive input pulley 142 in response to manual actuation of handle 20 of linear input mechanism 124. Line 150 combines with linear input mechanism 124 to form a continuous loop around input pulley 142 and idler pulley 152. This allows line 150 to drive input pulley 142 in either direction according to direction of the manual operation of handle 20.

Although described as a gear in some examples, input pulley 142 may also be a pulley without gear teeth, e.g., in examples in which line 150 includes a belt or cable rather than a chain. The output of input pulley 142 is operably coupled to gear reducer 140, which includes intermediate gears 144, 146, 148 and output gear 105. As described with respect to casement window operator 102, sash arm 104 is operably coupled to output gear 105 to rotate in conjunction with output gear 105. Gear reducer 140 operates to translate the linear movement of linear input mechanism 124 into the rotation of sash arm 104. The combined gear reduction through gear reducer 140 is such that the full opening and closing of sash 12 occurs over the range of movement of linear input mechanism 124.

Figure 5A:
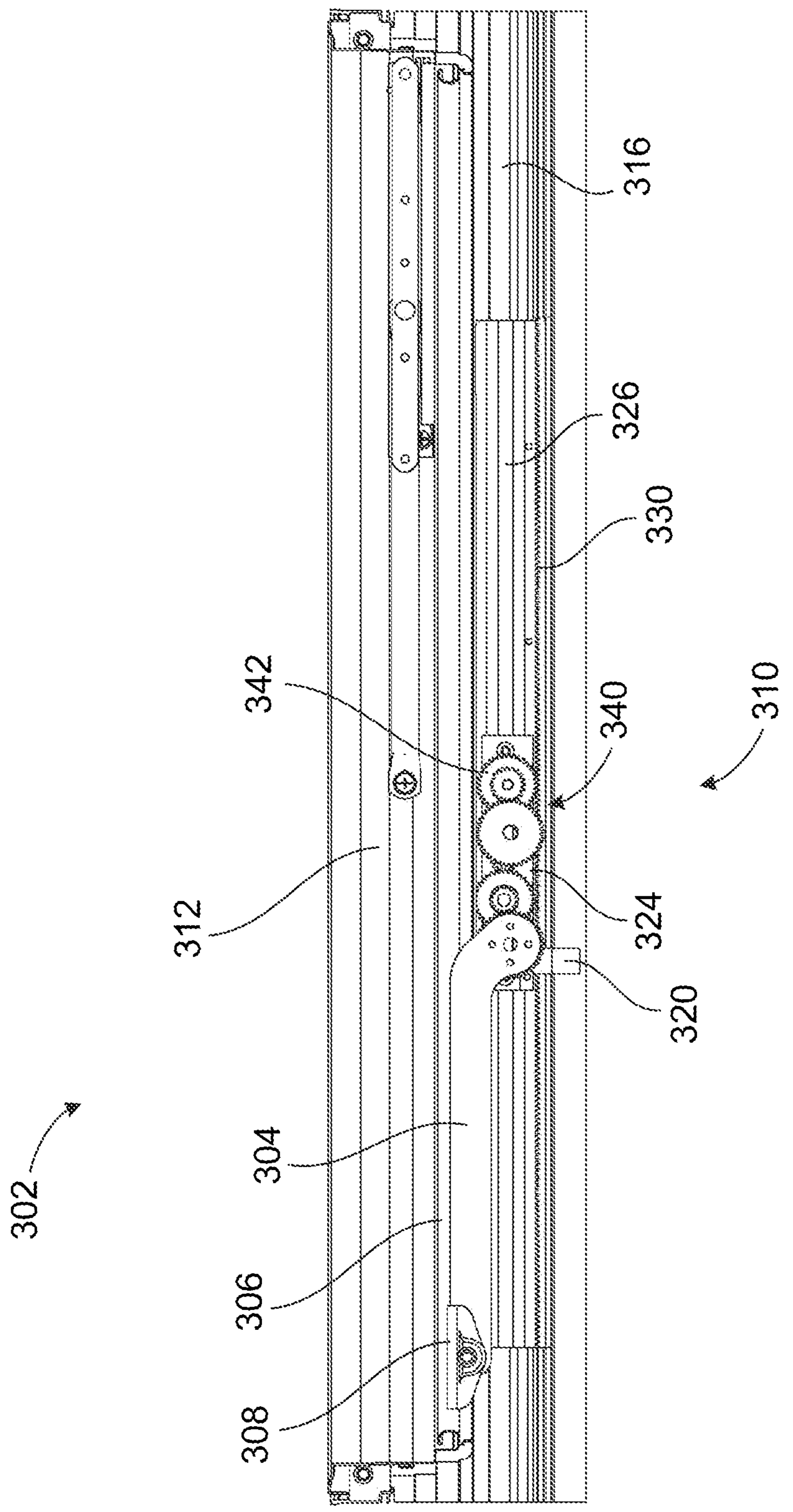
FIGS. 5A-5C illustrate a sliding operator handle including a brake, which may be used as a linear input mechanism in a casement window operator.
Figure 5B:
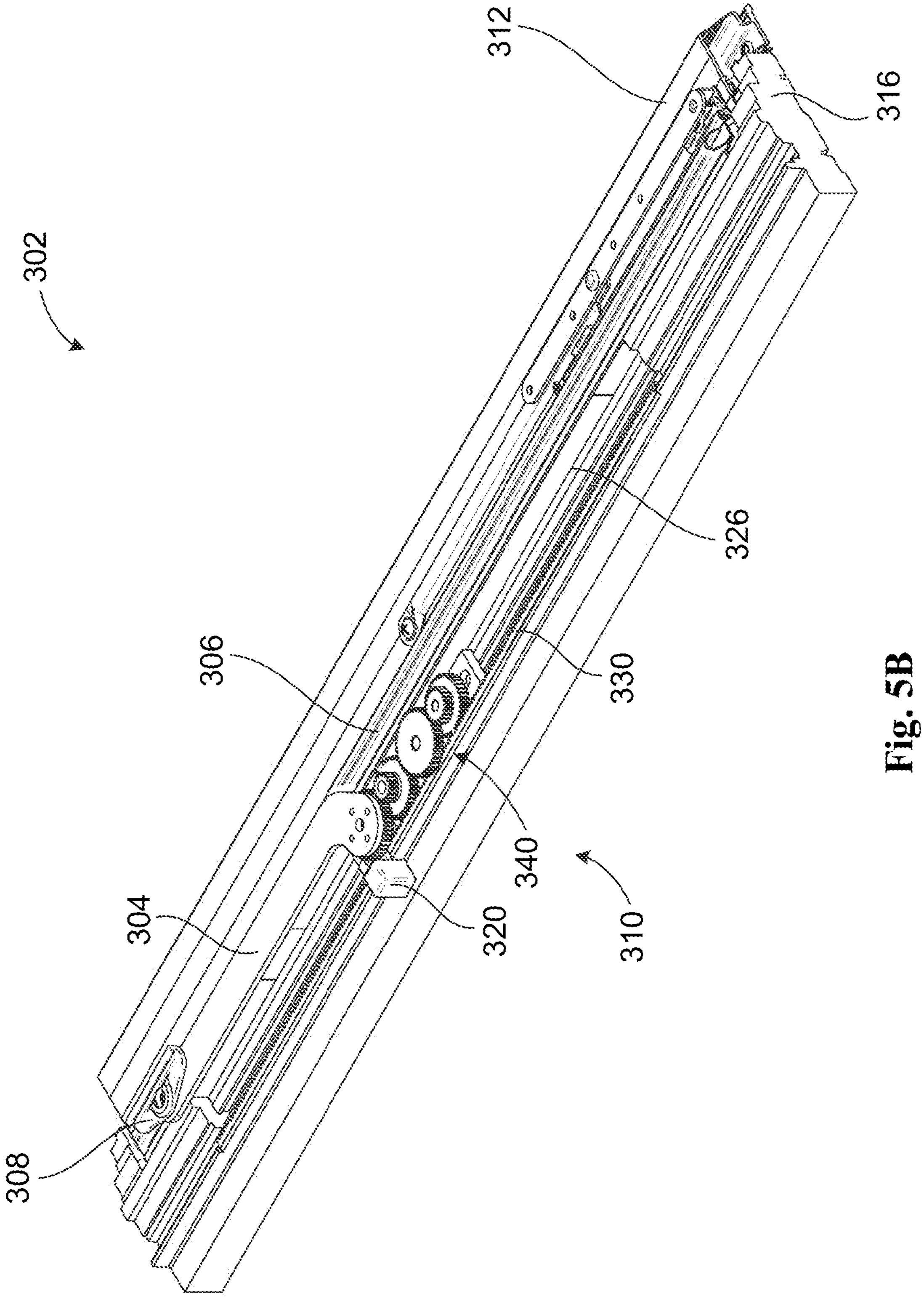
Figure 5C:
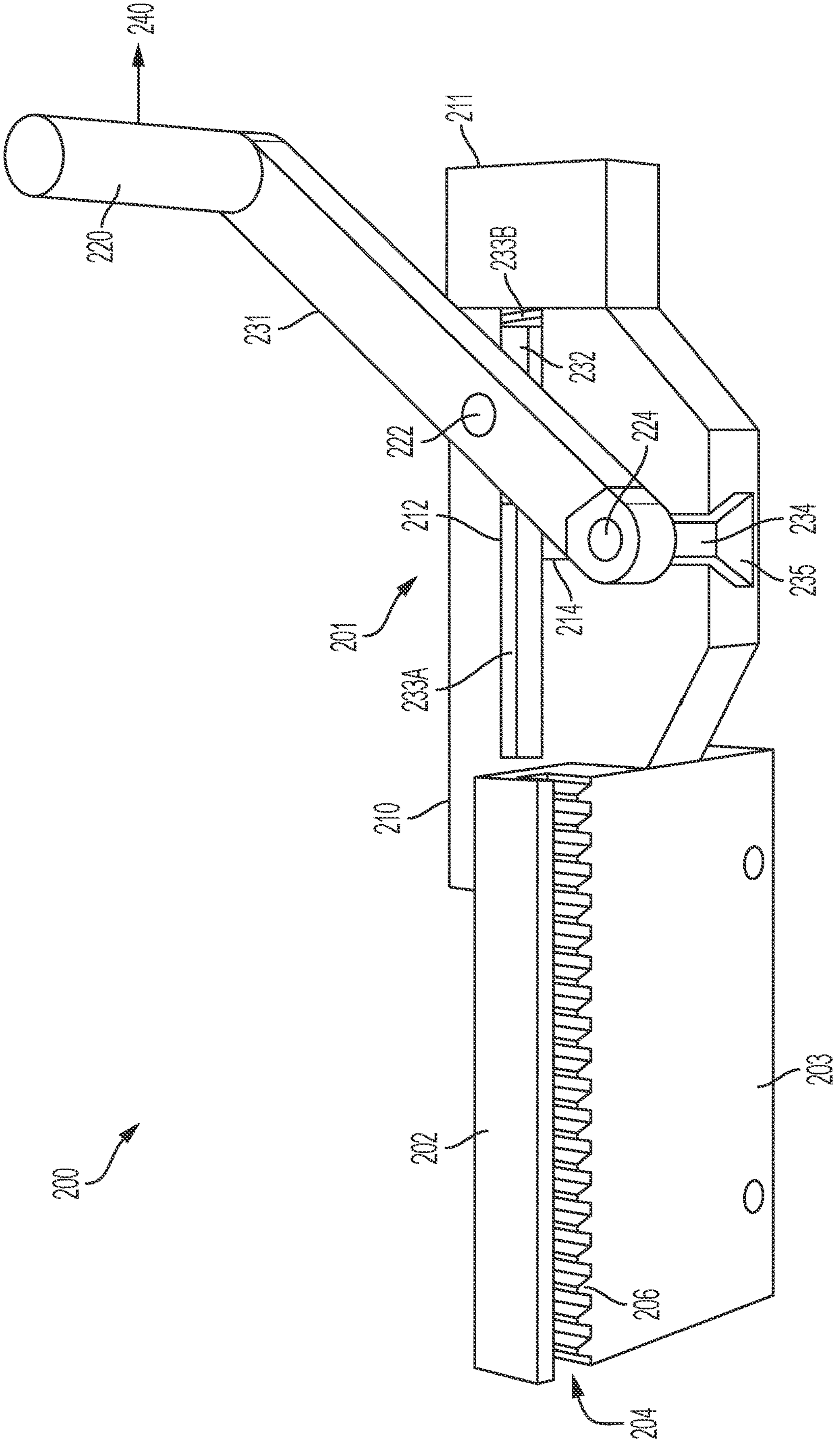

FIGS. 5A-5C illustrate a sliding operator handle 200 with brake mechanism 201. Specifically, FIG. 5A illustrates a front view of sliding operator handle 200, FIG. 5B illustrates a perspective view of sliding operator handle 200, and FIG. 5C illustrates a bottom perspective view of sliding operator handle 200. Sliding operator handle 200 may be used as a linear input mechanism in a casement window operator, such as linear input mechanism 124 in casement window operator 102 or casement window operator 102. Sliding operator handle 200 may also be used in other applications in which a sliding operator with braking is desired.

Sliding operator handle 200 includes brake mechanism 201, track mount 202, and handle 220. Track mount 202 is configured to slidably mate with a track. Track mount 202 includes a bottom surface 203 configured to register with a recessed portion of a track (not shown in FIGS. 5A-5C). Other surfaces of track mount 202 and/or other component surfaces of sliding operator handle 200 may also be configured to register with the track. Sliding operator handle 200 further includes recess 204 with toothed rack 206 which may drive a pinion gear (such as input pulley 142) in order to convert linear motion of sliding operator handle 200 to a rotary motion.

Brake mechanism 201 functions to restrict sliding motion of track mount 202 along the track. As part as a linear input mechanism in a casement window operator, break mechanism 201 is configured to hold a sash at a fully open position or at intermediate positions between the fully open position and the fully closed position. Brake mechanism 201 is spring loaded such that actuatable brake 234 interferes with the sliding of track mount 202 along the track. As described in further detail below, actuatable brake 234 is biased to a braking position when handle 220 is in a neutral position and inherently released when a manual actuation force is applied to handle 220.

Brake mechanism 201 includes brake housing 210 and actuatable brake 234 with braking surface 235. Actuatable brake 234 provides a braking position in which actuatable brake 234 is configured to contact the track and restrict sliding motion of track mount 202 along the track. Actuatable brake 234 further provides a sliding position in which actuatable brake 234 is configured to reduce contact with the track and allow sliding motion of track mount 202 along the track. Brake mechanism 201 is configured such that application of a manual input force on handle 220 in either direction results in the retraction of actuatable brake 234 from the track to allow to allow sliding motion of operator handle 200 along the track in response to a manual input force. In response to a manual input force in either direction, handle 220 pivots in either direction relative to track mount 202 in order to release actuatable brake 234 from its extended position in contact with the track.

Handle 220 includes handle shaft 231, which his pivotably coupled to track mount 202. Handle 220 is configured to receive a manual input force to slide track mount 202 in either direction along the track. An example manual input force 240 is illustrated, but an opposite manual input force may also be applied to handle 220 to slide track mount 202 in an opposing direction. Specifically, handle shaft 231 of handle 220 is attached to track mount 202 via a first sliding joint including slider 232 and recess 212 of brake housing 210. Handle 220 is pivotably coupled to handle 220 via pivot joint 222. Slider 232 has a single degree of freedom in that it is slideable back and forth within recess 212 of brake housing 210. Cap 211 closes the open end of recess 212 within brake housing 210 to prevent slider 232 from sliding out of recess 212 of brake housing 210. Actuatable brake 234 is attached to track mount 202 via a second sliding joint including actuatable brake 234, which also functions as a slider, and recess 214 of brake housing 210. Handle shaft 231 of handle 220 is also pivotably connected to actuatable brake 234 via pivot 224. In some examples, the first sliding joint including slider 232 and recess 212 of brake housing 210 is about perpendicular to the second sliding joint including actuatable brake 234 and recess 214 of brake housing 210.

Handle 220 is configured to actuate the actuatable brake in response to the manual input force. Specifically, brake mechanism 201 is configured such that application of a manual input force on handle 220 in either direction results in the retraction of actuatable brake 234 from the track to allow to allow sliding motion of operator handle 200 along the track in response to a manual input force. Handle 220 includes a neutral position corresponding to the braking position of the actuatable brake 234. In the neutral position, actuatable brake 234 is extended such that braking surface 235 is configured to contract the track to restrict sliding motion of operator handle 200 along the track. Springs 233A, 233B are located between the ends of recess 212 of brake housing 210 and slider 232 to bias slider 232, handle 220 and actuatable brake 234 to the neutral, braking position. While handle 220 is shown in a sliding position with spring 233B compressed more than spring 233A, in the neutral, braking position handle 220 can be about centered along recess 212 such that springs 233A, 233B are about equally compressed.

Handle 220 also includes a first actuation position (as shown) corresponding to the manual input force 240 in a first direction along the track. The first actuation position corresponds to the sliding position of actuatable brake 234 to allow sliding motion of track mount 202 along the track in the first direction. In the sliding position, actuatable brake 234 is at least partially retracted by handle shaft 231 through pivot 224 as handle 220 is rotated. By retracting actuatable brake 234 through application of a manual input force on handle 220, braking surface 235 is in reduced or no contract with the track to allow sliding motion of operator handle 200 along the track in response to the manual input force. Handle 220 includes a second actuation position corresponding to a manual input force in a second direction along the track, a direction opposing example manual input force 240, the second actuation position also corresponding to the sliding position of actuatable brake 234 to allow sliding motion of track mount 202 along the track in the second direction. In this manner, manual input force 240 or an opposing manual input force can be applied by a user to handle 220 to release actuatable brake 234 and slide sliding operator handle 200 along a track.

Figure 6A:
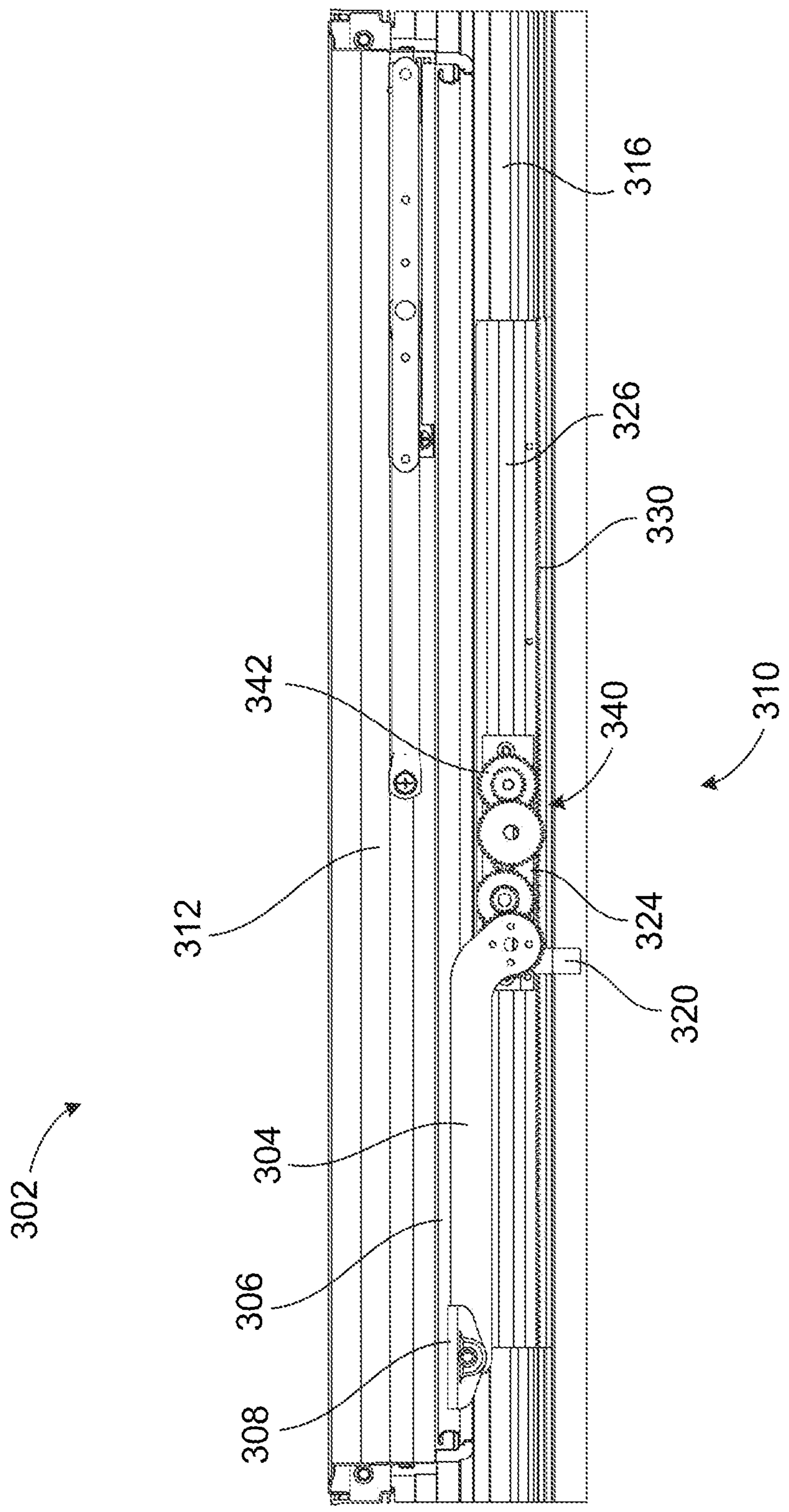
FIGS. 6A and 6B illustrate a casement window operator with a linear input mechanism in top and perspective views, respectively.
Figure 6B:
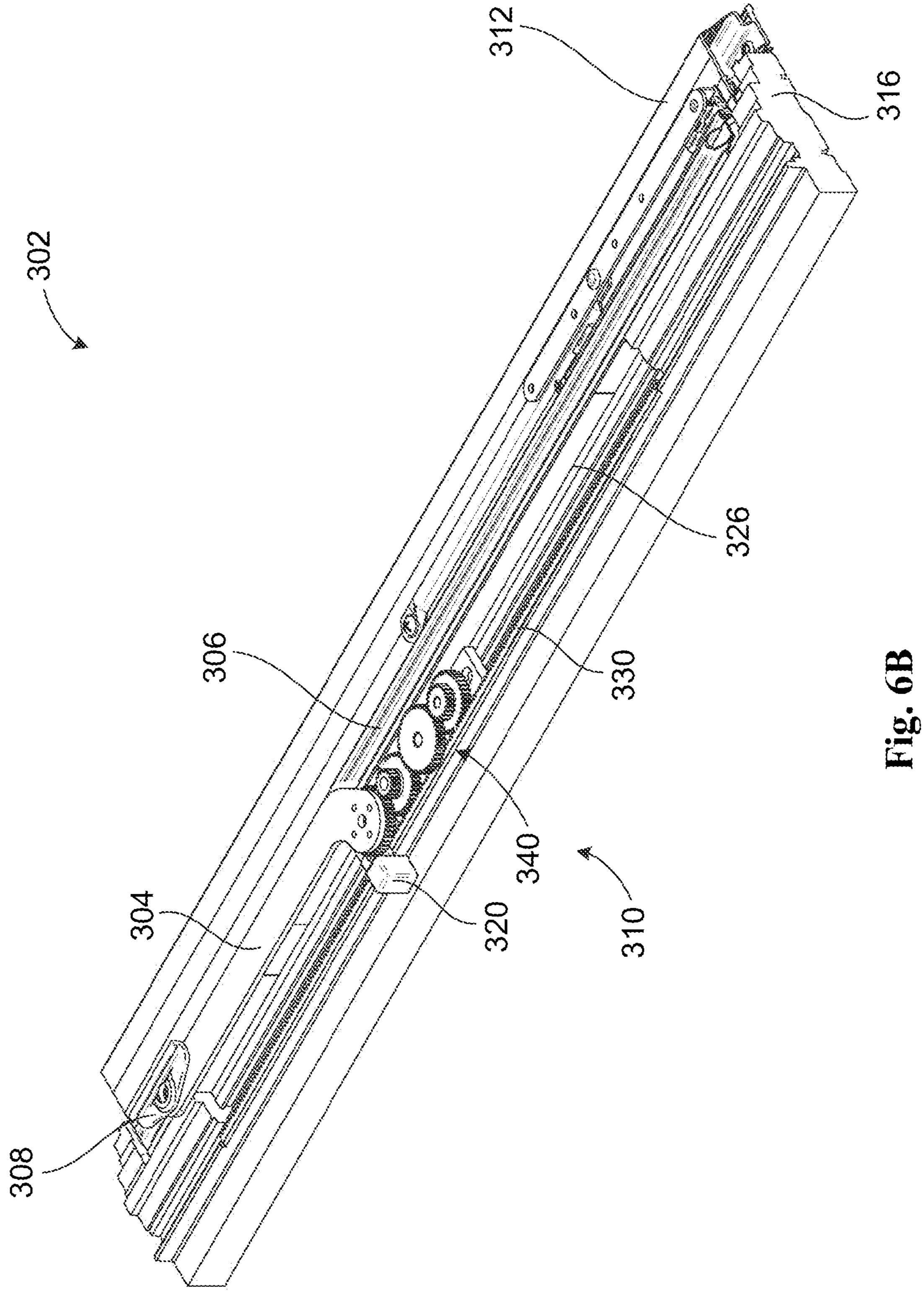

FIGS. 6A and 6B illustrate a casement window operator 302 with a linear input mechanism 324 in top and perspective views, respectively. Linear input mechanism 324 is part of gear train slide assembly 310, which further includes gear reducer 340. Portions of a window frame 316 and a rotatable sash 312 attached to window frame 316 are also shown. Window frame 316 and sash 312 may be part of a casement window, such as casement window 10, and may be the same or substantially similar to window frame 16 and sash 12 as described herein.

Sash 312 is operated via handle 320 of linear input mechanism 324 for opening and closing sash 312 by actuation of sash arm 304. Sash 312 is mounted to sash arm 304, which engages sash 312 via slider 308 and sash track 306 to drive opening and closing of sash 312. During the opening and closing of sash 32, slider 308 moves within sash track 306 of sash 312 to allow sash 312 to swing outwardly from window frame 316 while window frame 316 remains stationary. While sash arm 304 is shown as a single bar with slider 308 in sash track 306, in other examples, sash arm 304 may instead include two bars with a hinge, or otherwise form part of a four-bar linkage without sash track 306.

Sash arm 304 is actuated via casement window operator 302. Casement window operator 302 may be operated manually via handle 320 of linear input mechanism 324, which is mounted to frame 316. Handle 320 facilitates manual operation of casement window operator by a user via linear actuation of linear input mechanism 324. Linear input mechanism 324 is slideable along track 326. As shown track 326 is recessed within frame 316, which limits the intrusiveness of casement window operator 302 on a window. Portions of track 326 may be covered to further improve the aesthetics of casement window operator 302. In some examples, track 326 may include stops, such as endcaps to limit the range of motion of linear input mechanism 324. In some examples, linear input mechanism 324 may include linear bearings to facilitate smooth rotation of sash 312 via handle 320.

In the same or different examples, handle 320 and linear input mechanism 324 may combine to provide a break mechanism to hold sash 312 at a fully open position or at intermediate positions between the fully open position and the fully closed position. Such a break mechanism may include a spring loaded brake that interferes with the sliding of linear input mechanism 324 along track 326. For example, a spring loaded brake mechanism could be inherently released when a manual actuation force is applied to handle 320. In one example, handle 320 may pivot slightly in either direction relative to linear input mechanism 324 in order to release the spring-loaded brake when a manual actuation force is applied to handle 320. Of course, other breaking mechanisms may be substituted for a spring-loaded brake, or no brake may be used. As one example, gear train slide assembly 310 may include an actuatable brake 234, as described previously.

As shown, track 326 is mounted to the bottom of frame 316. In other examples, casement window operator 302 and track 326 may instead be mounted to the top of frame 316 or sides of frame 316. For example, mounting casement window operator 302 and track 326 to a side of frame 316 may be used with a bottom or top hinge pivot for sash 312 within frame 316.

A user may operate the casement window to open and close sash 312 via handle 320. Beginning with a closed sash 312, a user may release a lock (not shown), such as lock 14. Then, the user may pull handle 320 in a direction towards the hinged side of sash 312 to slide linear input mechanism 324, which drives input pulley 342 of gear reducer 340 via rack 330. As sash arm sash arm 304 is operably coupled to output gear 305, such action causes the opening of sash 312. The user may close sash 312 by pulling handle 320 in the opposite direction.

Linear input mechanism 324 is substantially the same as linear input mechanism 124. However, with casement window operator 302 gear reducer 340 is mounted to linear input mechanism 324, rather than to frame 316. In contrast, as described previously, with casement window operator 102 gear reducer 140 is mounted to frame 16. Input gear 342 of gear reducer 340 directly contacts rack 330, which is mounted to frame 316. So the interaction of linear input mechanism 324 along track 326, relative to frame 316 causes rack 330 to drive input gear 342. Gear reducer 340 further includes a series of intermediate gears which translate the rotation of input gear 342 into rotation of output gear 305.

Sash arm 304 is operably coupled to output gear 305 to rotate in conjunction with output gear 305. Thus, gear reducer 340 operates to translate the linear movement of linear input mechanism 324 along track 326 into the rotation of sash arm 304. The combined gear reduction through gear reducer 340 is such that the full opening and closing of sash 312 occurs over the range of movement of linear input mechanism 324.

Gear reducer 340 further serves to limit the force required to open and close sash 312 via handle 320. In one example, a force of about 4 pounds was required to overcome the sealing force of a gasket between frame 316 and sash 312 while initially opening sash 312, whereas a force of only about 2 pounds was required for moving sash 312. Generally, it may be preferable to limit the force required to open and close sash 312 via handle 320 to less than about 10 pounds or even to less than about 5 pounds. Of course, these forces are merely examples and the actual forces required will vary according to the size, weight, design and construction of the casement window and its components, including the range of motion for linear input mechanism 324 and the gear ratio of gear reducer 340.

In addition, the location of slider 308 in sash track 306 further changes the effective ratio of movement of handle 320 relative to the rotation of sash 312. During initial opening slider 308 at its furthest position from the hinge (not shown) of sash 312, which provides the greatest mechanical advantage. Such a configuration may be helpful to limit the force required to overcome a gasket sealing force between sash 312 and frame 316 during initial opening of sash 312.

Casement window operator 302 with gear train slide assembly 310 may provide a number of advantages. For example, in gear train slide assembly 310, sash arm 304 may be short than sash arm 104 of casement window operator 102 due to the movement of the pivot point of sash arm 304 in conjunction with linear input mechanism 324. This may reduce operational forces compared to casement window operator 102 and other window operators with fixed pivots on the window frame. The design of gear train slide assembly 310 allows for more stroke when moving the gear train slide assembly with respect to a fixed rack then vice versa Furthermore, with gear train slide assembly 310, a braking mechanism can be integrated with the assembly forming gear reducer 340 and linear input mechanism 324, rather than a separate brake mechanism connected to a handle such as with handle 20. The combined assembly of gear reducer 340 and linear input mechanism 324 also facilitates a longer sled in track 326, which may limit friction forces from off axis torque applied to handle 320 compared to handle 20 and linear input mechanism 124.

Gear train slide assembly 310 also allows for an integrated brake assembly to address back driving under windload as a component of the gear train slide assembly 310 instead of need for a brake on a separate handle assembly as with casement window operator 102. Such a brake may be of any suitable design, such as, a dual direction spring clutch design, a friction brake, mechanical detent or other brake design. As one example, gear train slide assembly 310 may include an actuatable brake 234, as described previously.

Various modifications and additions can be made to the exemplary examples discussed without departing from the scope of the present disclosure. For example, while the examples described above refer to particular features, the scope of this disclosure also includes examples having different combinations of features and examples that do not include all of the above described features.

What is claimed is:

1. A sliding operator for a casement window including a track, the sliding operator handle comprising:

a track mount configured to slidably mate with the track;

an actuatable brake providing at least one braking position in which the actuatable brake is configured to contact the track and restrict sliding motion of the track mount along the track; and at least one sliding position in which the actuatable brake is configured to reduce contact with the track and allow sliding motion of the track mount along the track, wherein the actuatable brake includes a brake housing; and a handle pivotably coupled to the track mount, wherein the handle is coupled to the track mount via a first sliding joint including a first slider and a first recess of the brake housing.

2. The sliding operator of claim 1, wherein the handle is configured to receive a manual input force to slide the track mount in either direction along the track.

3. The sliding operator of claim 2, wherein the handle is configured to actuate the actuatable brake in response to the manual input force.

4. The sliding operator of claim 1, wherein the handle includes a neutral position corresponding to the at least one braking position of the actuatable brake.

5. The sliding operator of claim 1, wherein the handle includes a first actuation position corresponding to the manual input force in a first direction along the track, the first actuation position corresponding to the at least one sliding position of the actuatable brake to allow sliding motion of the track mount along the track in the first direction.

6. The sliding operator of claim 5, wherein the handle includes a second actuation position corresponding to the manual input force in a second direction along the track, the second actuation position also corresponding to the at least one sliding position of the actuatable brake to allow sliding motion of the track mount along the track in the second direction.

7. The sliding operator of claim 1, wherein the actuatable brake is spring loaded.

8. The sliding operator of claim 1, wherein the slider has a single degree of freedom such that the first slider is slidable back and forth within the first recess of the housing.

9. The sliding operator of claim 8, wherein the actuatable brake includes a cap operable to close an open end of the first recess to limit the first slider from sliding out of the first recess.

10. The sliding operator of claim 9, wherein the brake housing of the actuatable brake includes a second sliding joint including a second slider and a second recess, wherein the second sliding joint is about perpendicular to the first sliding joint.

11. The sliding operator of claim 10, wherein the actuatable brake further includes a spring positioned between the first recess and the slider, the spring operable to bias the slider and the handle to a neutral portion corresponding to a braking position of the actuatable brake.

12. A casement window comprising:

a frame including a track;

a panel operable to be moveably coupled to the frame;

a sliding operator operable to be coupled to the frame and the panel, the sliding operator handle including:

a track mount configured to slidably mate with the track;

an actuatable brake providing at least one braking position in which the actuatable brake is configured to contact the track and restrict sliding motion of the track mount along the track; and at least one sliding position in which the actuatable brake is configured to reduce contact with the track and allow sliding motion of the track mount along the track, wherein the actuatable brake includes a brake housing; and a handle pivotably coupled to the track mount, wherein the handle is coupled to the track mount via a first sliding joint including a first slider and a first recess of the brake housing.

13. The casement window of claim 12, wherein the slider has a single degree of freedom such that the first slider is slidable back and forth within the first recess of the housing.

14. The casement window of claim 13, wherein the actuatable brake includes a cap operable to close an open end of the first recess to limit the first slider from sliding out of the first recess.

15. The casement window of claim 14, wherein the brake hosing of the actuatable brake includes a second sliding joint including a second slider and a second recess, wherein the second sliding joint is about perpendicular to the first sliding joint.

16. The casement window of claim 15, wherein the actuatable brake further includes a spring positioned between the first recess and the slider, the spring operable to bias the slider and the handle to a neutral portion corresponding to a braking position of the actuatable brake.

17. The casement window of claim 12, wherein the handle is configured to receive a manual input force to slide the track mount in either direction along the track.

18. The casement window of claim 17, wherein the handle is configured to actuate the actuatable brake in response to the manual input force.

* * * * *